United States Patent [19]
Tyau

[11] 3,882,329
[45] May 6, 1975

[54] GATE GENERATOR WITH J-K FLIP-FLOPS

[75] Inventor: Walter Fah Min Tyau, Orange, Calif.

[73] Assignee: International Telephone & Telegraph Corporation, New York, N.Y.

[22] Filed: Jan. 21, 1974

[21] Appl. No.: 435,257

Related U.S. Application Data

[62] Division of Ser. No. 304,997, Nov. 9, 1972, Pat. No. 3,832,883.

[52] U.S. Cl............. 307/247 R; 307/215; 307/289; 307/291
[51] Int. Cl........................ H03k 17/00; H03k 3/12
[58] Field of Search........ 307/215, 218, 247 R, 291, 307/289; 328/195, 206

[56] References Cited
UNITED STATES PATENTS

| | | | |
|---|---|---|---|
| 3,351,778 | 11/1967 | Seelbach et al................. | 307/247 R |
| 3,541,356 | 11/1970 | Lagemann.......................... | 307/289 |
| 3,549,912 | 12/1970 | Lewis................................. | 307/291 |
| 3,590,280 | 6/1971 | Hudson et al...................... | 307/291 |
| 3,786,276 | 1/1974 | Rosch............................. | 307/247 R |

*Primary Examiner*—Stanley D. Miller, Jr.
*Attorney, Agent, or Firm*—A. Donald Stolzy

[57] ABSTRACT

A gate generator including first and second JK flip-flops each having inhibit, J, K, and drive inputs. The inhibit inputs are also commonly known as the set and reset inputs. It is common to refer to the outputs of the flip-flops as the Q and Q̄ outputs. A D.C. source of potential is provided from which a resistor is connected to each J input. Both K inputs are connected to ground. A source of pulses is also provided. Both clock inputs are connected from the pulse source. A NAND gate having first and second inputs and an output has the Q̄ output of the first flip-flop connected to the NAND gate first input. The Q output of the second flip-flop is connected to the NAND gate second input. The second flip-flop Q output is connected to the reset input and the first flip-flop. Manually operable means are then provided for momentarily changing the potential at the second flip-flop reset input to cause the Q output of the second flip-flop to be high.

1 Claim, 6 Drawing Figures

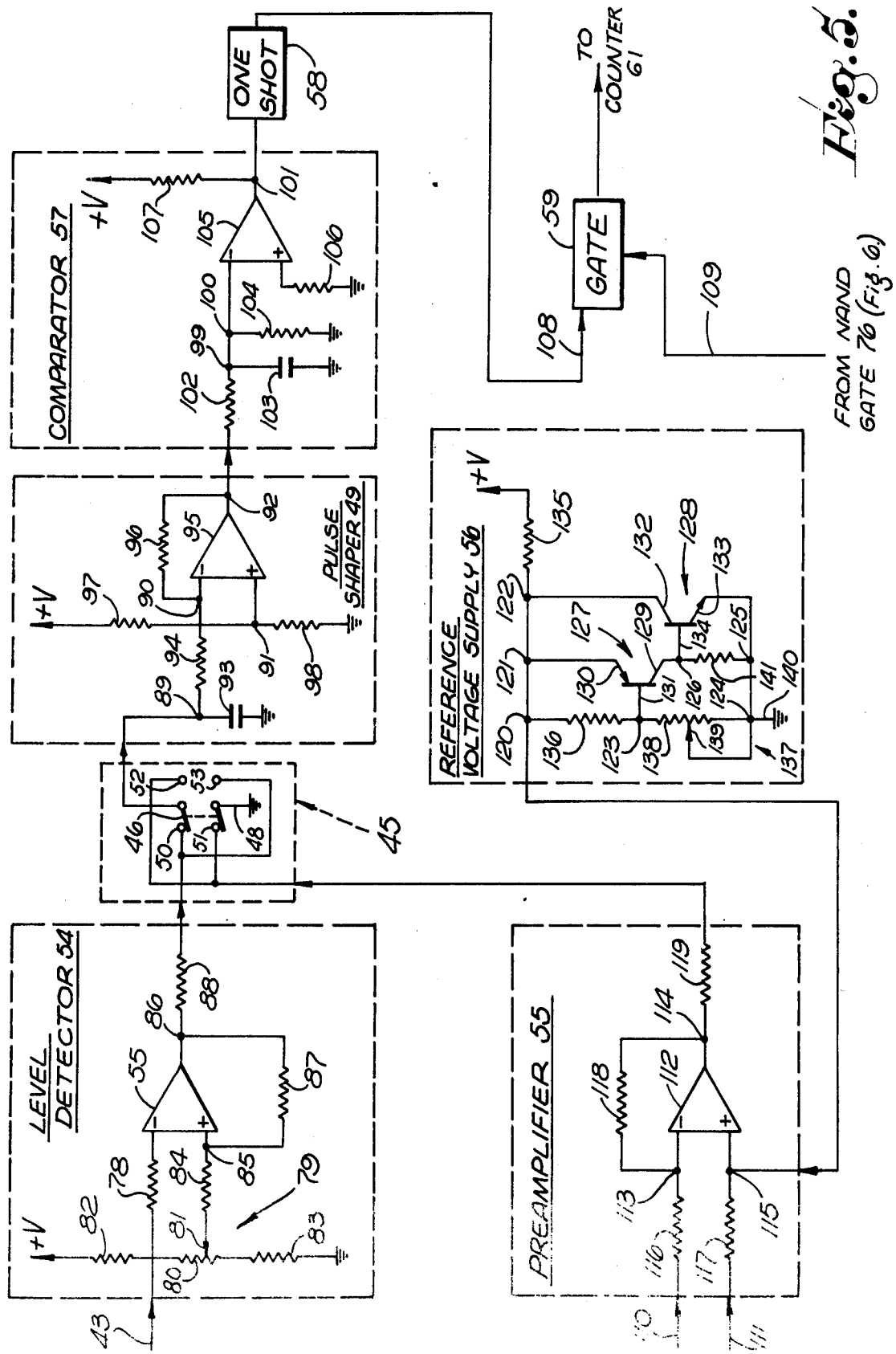

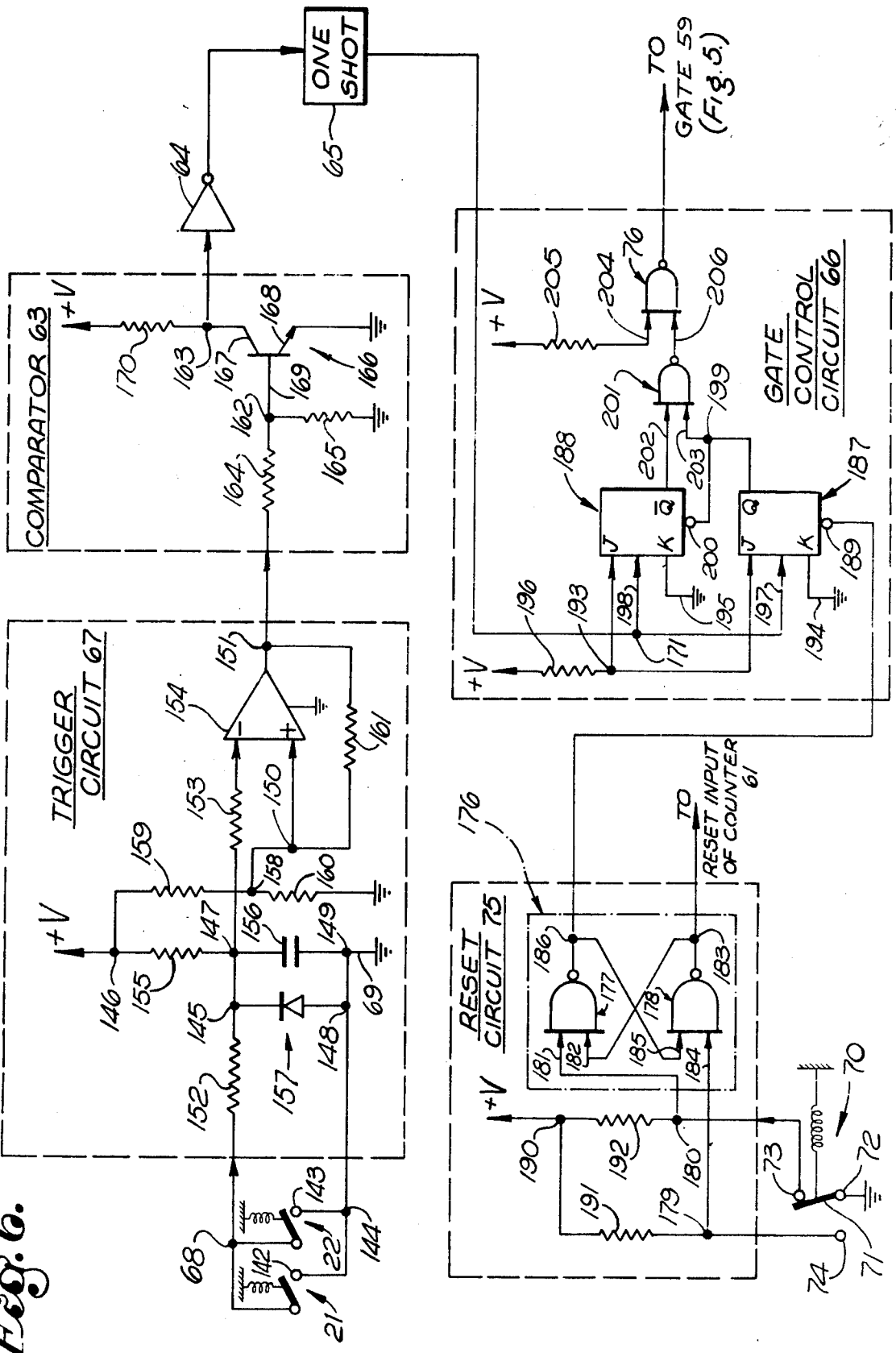

3,882,329

1

GATE GENERATOR WITH J-K FLIP-FLOPS

This application is a division of copending application Ser. No. 304,997 filed Nov. 9, 1972 now U.S. Pat. No. 3,832,883, of the same title and inventor as this application. The benefit of the filing date of said copending application is, therefore, hereby claimed for this application.

BACKGROUND OF THE INVENTION

This invention relates to test equipment and components thereof, and more particularly, to pulse operated logic circuits and accurate pulse supply means therefor.

In the past it has been the practice to test the accuracy of flowmeters, which flowmeters produce pulses at a pulse repetition frequency (PRF) directly proportional to the volume rate of fluid flow, by connecting them in series with the pipeline section of a ball prover. A section of a ball prover pipeline has two axially spaced, normally open momentary contact switches therein. The pulse output of the flowmeter under test is then counted during the time interval between the successive closures of the respective switches. The switches are actuated by the movement of a spherical ball in the prover pipeline. The ball has a diameter only slightly less than the inside diameter of the pipeline section so as to roll freely therein without allowing substantial fluid leakage therearound. The counted output pulses of the flowmeter under test are then recorded for several different flow rates to determine if there is any nonlinearity. For a flowmeter with perfect linearity, the counted pulses for several test runs may be exactly the same or may not vary more than one pulse or a few pulses.

Prior art ball provers suffer from at least one serious disadvantage. The switches each have a pair of contacts that are mutually engaged or separate more than once when they are actuated. That is, they are conventional switches that may have, for example, bias springs and/or cantilever leaf springs to carry the contacts. The material of the contacts themselves are resilient as are the leaf or bias springs. Due to these factors alone and/or other factors, the contacts, therefore, bounce. The bouncing contacts then cause multiple pulse inputs to be provided to the ball prover circuit. These multiple pulse inputs create errors in the timing interval during which the flowmeter output pulses are counted. The ball prover then fails to perform its only function, i.e. to determine the accuracy of the flowmeter under test.

SUMMARY OF THE INVENTION

In accordance with the present invention, the above-described and other disadvantages of the prior art are overcome by the use of a regenerative amplifier having hysteresis and/or a capacitor which charges slowly when both switches are open and discharges rapidly when either switch is closed. The slow charging then prevents a bounce caused discharge from generating a high amplitude operating pulse.

According to another feature of the invention, a logic gate control circuit is provided to operate a gate responsive to the switch generated pulses. The gate thus passes the flowmeter output pulses only during the said timing interval.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 5 is a schematic diagram of a portion of the circuit of FIG. 4; and

FIG. 6 is a schematic diagram of another portion of the circuit of FIG. 4.

DESCRIPTION OF THE PREFERRED EMBODIMENT

Figure 1:
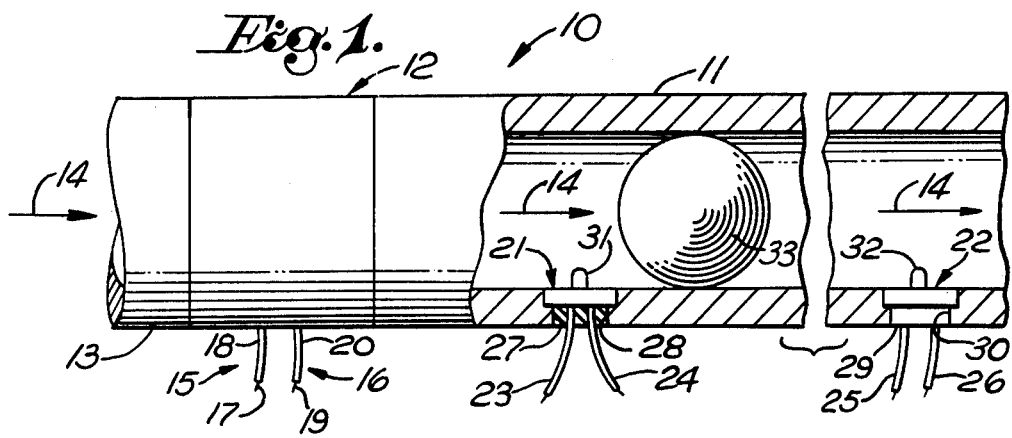
FIG. 1 is a side elevational view, partly in section, of a portion of a ball prover.

In the drawings, in FIG. 1, a portion of a ball prover is indicated at 10 including a pipeline section 11 connected from a flowmeter section 12. Flowmeter section 12 is, in turn, connected from an inlet pipeline section 13. Typically, a fluid or liquid flow may be maintained through the sections 11, 12 and 13 in the direction of horizontal arrows 14 shown in FIG. 1.

Flowmeter 12 has output leads 15 and 16. Lead 15 has a center conductor 17 with insulation 18 therearound. Lead 16 has a conductor 19 with insulation 20 therearound.

Momentary contact switches 21 and 22 are positioned, for example, at the same circumferential point around the interior of pipeline section 11, but are spaced axially from each other. Switch 21 has leads 23 and 24. Switch 22 has leads 25 and 26.

Leads 23 and 24 are sealed through a disc 27, which, in turn, is sealed within a bore 28 through the wall of pipeline section 11. Leads 25 and 26 are sealed to a disc 29, and disc 29 is sealed in a bore 30 through the wall of pipeline section 11 in an identical manner. Switches 21 and 22 are entirely conventional. Further, switch 22 may be identical to switch 21. Both of the switches 21 and 22 may be fluid tight switches.

Switch 21 is a normally open, momentary contact switch having a spring biased plunger 31. Switch 21 is closed when plunger 31 is depressed. Switch 22 has a plunger 32 identical to plunger 31.

The portion 10 of the ball prover has a spherical ball 33 with a diameter which is only slightly less than the inside diameter of pipeline section 11. If desired, pipeline section 11 and a ball 33 may be constructed so that ball 33 is slidable through the interior of pipeline section 11, but does not permit any substantial amount of fluid to leak between ball 33 and pipeline section 11.

If desired, the diameter of ball 33 may be sufficiently small for it to simply roll inside pipeline section 11.

In FIG. 1, ball 33 is shown at an axial position between the switches 21 and 22. However, in operation, the ball 33 is located on the left side of switch 21 to begin a test operation. Fluid is then pumped through inlet 13 in the direction of arrows 14. As ball 33 rolls over switch plunger 31, switch 21 will be closed momentarily. As ball 33 keeps rolling, switch plunger 32 will be depressed and switch 22 will be closed momentarily.

Note will be taken that the axial spacing of switches 21 and 22 is invariant. Thus, if the flow rate through pipeline section 11 is constant while ball 33 is rolling, the time interval between the closure of switches 21 and 22 will be directly proportional to the rate of fluid flow through pipeline section 11. For these reasons, the ball prover may be employed to test the accuracy and linearity of flowmeter 12. Flowmeter 12 may be any conventional flowmeter which produces output pulses at a pulse repetition frequency which is directly proportional to the volume rate of flow.

Figures 2, 3:
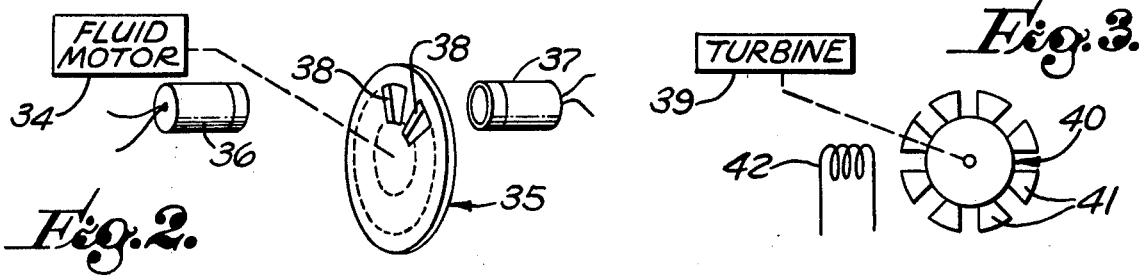
FIG. 2 is a diagrammatic view of one type of a conventional flowmeter.
FIG. 3 is a diagrammatic view of another type of conventional flowmeter.

Flowmeter 12 may be of the type shown in FIG. 2, if desired. This flowmeter includes a fluid motor 34 which is driven by the flowing fluid, a disc 35, which is driven by fluid motor 34, a lamp 36 and a photocell 37. Disc 35 has apertures 38 extending completely therethrough that extend around the circumference of disc 35. The width of the apertures 38, shown in FIG. 2, have been exaggerated for clarity. The apertures 38 are equally spaced around the circumference of disc 35. The output of photocell 37 is a pulse train having a pulse repetition frequency (PRF) which is directly proportional to the volume rate of fluid flow.

Another form of conventional flowmeter is shown in FIG. 3 including a turbine 39 which drives a disc 40. Disc 40 has radially polarized permanent magnets 41 fixed thereto. Thus, as disc 40 is rotated by turbine 39, the passage of permanent magnets 41 past an inductive winding 42 induces pulses in winding 42 at a PRF which is directly proportional to the volume rate of fluid flow.

Figure 4:
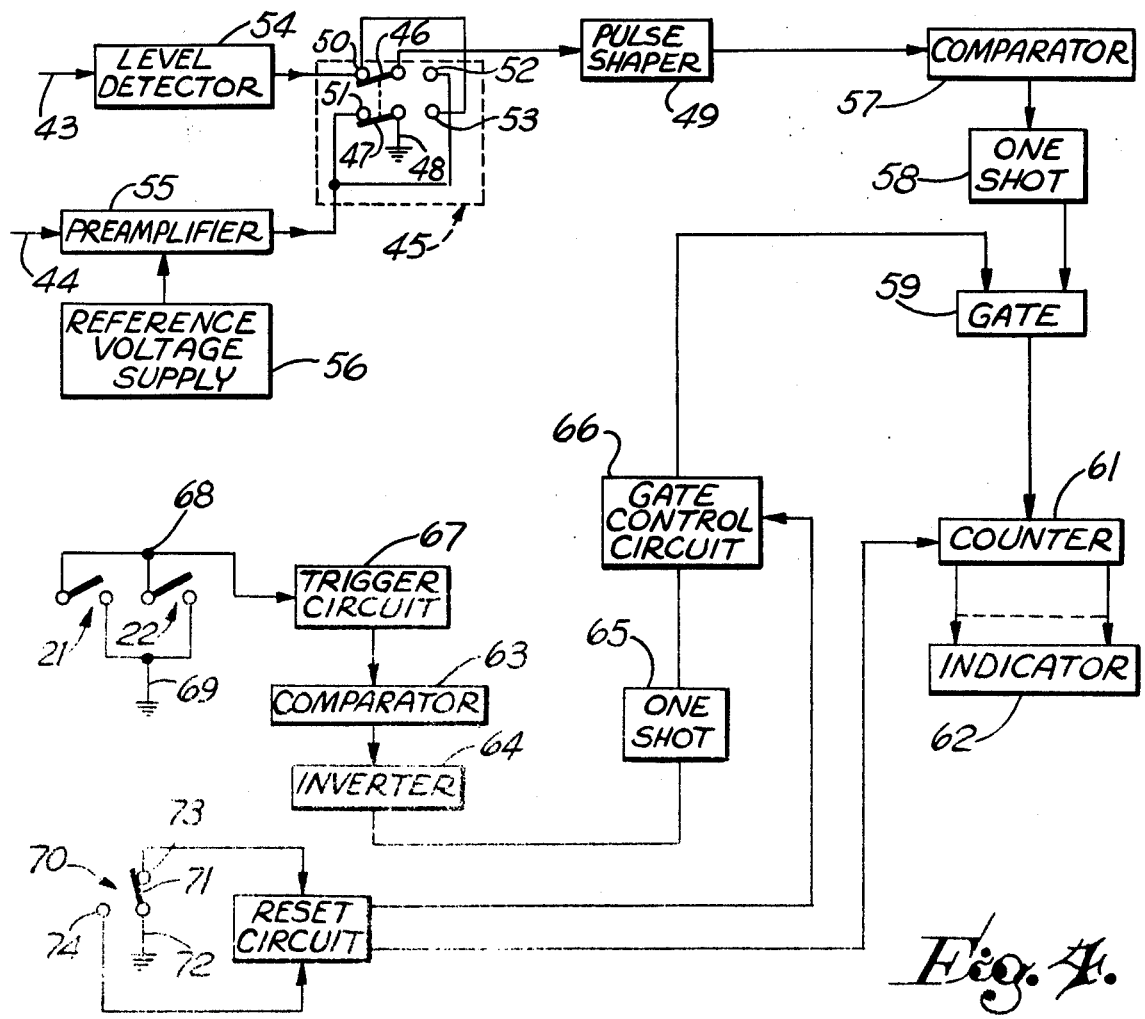
FIG. 4 is a block diagram of a ball prover circuit constructed in accordance with the present invention.

One embodiment of the ball prover circuit of the present invention is shown in FIG. 4. This circuit may be employed to test any kind of flowmeter which produces output pulses at a PRF directly proportional to the volume rate of fluid flow. However, preferably, if the flowmeter to be tested is of the type shown in FIG. 3, preferably its input is applied at 44.

The circuit shown in FIG. 4 is not employed to test the same or two different flowmeters simultaneously. If the flowmeter under test is connected to input lead 43, a double-pole, double-throw switch is placed in the solid line position shown at 45. If a flowmeter is connected to the input lead 44, the switch 45 is thrown to the other position thereof, not shown.

In FIG. 4, switch 45 includes a pair of poles 46 and 47 ganged together. Pole 47 is grounded at 48. Pole 46 is connected to a pulse shaper 49.

Switch 45 has contacts 50, 51, 52 and 53. The lead 43 is connected to contact 50 via a level detector 54. The lead 44 is connected via a preamplifier 55 to contacts 51 and 52, a reference voltage supply 56 being connected to preamplifier 55. Contacts 50 and 53 are connected together.

The output of pulse shaper 49 is connected via a comparator 57, a one-shot multivibrator 58, and a gate 59 to a pulse counter 61.

Pulse counter 61 counts the number of pulses produced by the flowmeter under test during the interval between the successive closures of switches 21 and 22. The total of this count is indicated on an indicator 62 connected from counter 61. Counter 61 may be entirely conventional. Indicator 62 may also be entirely conventional. Indicator 32 may be a decimal reading indicator, if desired. Alternatively, indicator 62 may simply incorporate a row of lamps. In this case, counter 61 may be a binary counter. If this is true, each lamp in indicator 62 may be connected from the 1 output of each flip-flop in counter 61.

In some cases, input lead 43 may be connected directly to contact 50. Similarly, in some cases, the input lead 44 may be connected directly to contacts 51 and 52. Again, pole 46 may be connected, in some cases, directly to gate 59. If this is true, pulse shaper 49, comparator 57 and one-shot 58 may be omitted.

Level detector 54, pulse shaper 49, comparator 57 and one-shot 58 are simply pulse conditioning circuits to obtain proper levels, leading and/or trailing edge slopes and pulse widths.

Also shown in FIG. 4, is a comparator 63, an inverter 64, a one-shot multivibrator 65 and a gate control circuit 66 which are connected in succession in that order from a trigger circuit 67 to gate 59.

Note will be taken that in FIG. 4, switches 21 and 22 are connected in parallel with each other from a junction 68 to ground at 69. The input to trigger circuit 67 is connected from junction 68.

A single-pole, double-throw momentary contact switch 70 is provided having a pole 71 which is grounded at 72, and contacts 73 and 74.

Switch 70 is entirely conventional, the pole 71 thereof being spring biased to the position shown in solid lines in FIG. 4. Contact 73 is, therefore, a normally closed contact. Contact 74 is a normally open contact.

Contacts 73 and 74 are connected to a reset circuit 75 which provides reset inputs to counter 61 and gate control 66.

Comparator 63, as well as comparator 57, may be considered simply pulse conditioning circuits.

As shown in FIG. 5, level detector 54 includes a differential amplifier 55. Lead 43 is connected to the inverting input of amplifier 55 via a resistor 78. A potentiometer is provided at 79 having a winding 80, and a wiper 81. A resistor 82, winding 80 and a resistor 83 are connected in series in succession in that order from a potential +V to ground. A resistor 84 is connected from wiper 81 to the noninverting input of amplifier 55 at a junction 85. The output of amplifier 55 is connected to a junction 86. A feedback resistor 87 is connected between junctions 85 and 86. A resistor 88 is connected from junction 86 to contact 50 of switch 45.

Pulse shaper 49 has junctions at 89, 90, 91 and 92. A capacitor 93 is connected from junction 89 to ground. Pole 46 of switch 45 is connected to junction 89. A resistor 94 is connected between junctions 89 and 90, junction 90 being connected to the inverting input of a differential amplifier 95. A feedback resistor 96 is connected between junctions 90 and 92, junction 92 being connected from the output of amplifier 95.

Resistors 97 and 98 are connected in succession in series in that order from potential +V to ground, resistor 98 being connected from junction 91 to ground, resistor 97 being connected from potential +V to junction 91.

Comparator 57 has junctions 99, 100 and 101. A resistor 102 is connected from junction 92 to junction 99. A capacitor 103 is connected from junction 99 to ground. A resistor 104 is connected from junction 100 to ground, junctions 99 and 100 being connected together and to the inverting input of a differential amplifier 105. A resistor 106 is connected from the noninverting input of amplifier 105 to ground. A resistor 107 is connected from junction 101 to potential +V. Junction 101 is connected to the input of one-shot 58. The output of one-shot 58 is connected to one input of the gate 59. Gate 59 receives another input from the output of NAND gate 76 shown in gate control circuit 66 in FIG. 6.

The output of gate 59 is connected to the input of counter 61, as described previously, but shown both in FIGS. 4 and 5.

In FIG. 5, the leads at the ends of winding 42, shown in FIG. 3, may be connected respectively to leads 110 and 111, shown in FIG. 5.

In FIG. 5, preamplifier 55 includes a differential amplifier 112, and various junctions 113, 114 and 115 respectively connected to the inverting input, the output and the noninverting inputs of amplifier 112. Lead 110 is connected to junction 113 via a resistor 116. Lead 111 is connected to junction 115 by a resistor 117. A feedback resistor 118 is connected between junctions 113 and 114. A resistor 119 is connected from junction 114 to the contacts 51 and 52 of switch 45.

The output of reference voltage supply 56 is connected to preamplifier 55 at junction 115. Supply 56 has junctions at 120, 121 and 122, all of which are connected together from junction 115. Junctions are also provided at 123, 124, 125 and 126. Supply 56 includes transistors 127 and 128. Transistor 127 has a collector 129, an emitter 130 and a base 131. Transistor 128 has a collector 132, an emitter 133 and a base 134.

A resistor 135 is connected from junction 122 to potential +V. A resistor 136 is connected between junctions 120 and 123. A potentiometer is provided at 137 including a winding 138 and a wiper 139. Winding 138 is connected between junctions 123 and 124, junction 124 being grounded at 140. Wiper 139 is connected to junction 124. A resistor 141 is connected between junctions 125 and 126. Emitter 130 is connected from junction 121. Base 131 is connected from junction 123. Collector 129 is connected to junction 126 as is base 134. Emitter 133 is connected to junction 125, junction 125 also being connected to junction 124. Collector 132 is connected to junction 122.

As shown in FIG. 6, switches 21 and 22 have contacts 142 and 143, both of which are connected to a junction 144.

Trigger circuit 67 has various junctions at 145, 146, 147, 148, 149, 150 and 151. Junctions 144, 148 and 149 are all grounded at 69. A resistor 152 is connected between junctions 68 and 145, junctions 145 and 147 being connected together. A resistor 153 is connected from junction 147 to the inverting input of a differential amplifier 154. A resistor 155 is connected between junctions 146 and 147. A capacitor 156 is connected between junctions 147 and 149. Junction 146 is maintained at potential +V. A diode 157 is connected between junctions 145 and 148, and poled to be conductive in a direction toward junction 145.

Another junction 158 is provided. A resistor 159 is connected between junctions 146 and 158. Another resistor 160 is connected from junction 158 to ground, junctions 150 and 158 being connected together and to the noninverting input of differential amplifier 154. A feedback resistor 161 is connected between junctions 150 and 151, junction 151 also being connected from the output of amplifier 154.

Comparator 63 has junctions at 162 and 163. A resistor 164 is connected between junctions 151 and 162. A resistor 165 is connected from junction 162 to ground.

Comparator 63 includes a transistor 166 having a collector 167, an emitter 168 and a base 169. Base 169 is connected from junction 162. Collector 167 is connected to junction 163. A resistor 170 is connected from junction 163 to potential +V. Emitter 168 is connected to ground. Inverter 64 and one-shot 65 are connected in succession in that order from junction 163 to a junction 171 in gate control circuit 66.

Reset switch 70 is again shown in FIG. 6. Switch 70 is an entirely conventional momentary contact switch wherein the pole 71 is spring biased against contact 73. Pole 71, for reset, may then be moved to a position in engagement with contact 74 momentarily. Switch 70 is connected to reset circuit 75, as shown.

Reset circuit 75 includes an entirely conventional flip-flop 176 including NAND gates 177 and 178.

Reset circuit 75 has junctions 179 and 180 connected respectively from contacts 74 and 73. NAND gate 177 has one input 181 connected from junction 180, and another input 182 connected from a junction 183. Junction 183 is connected from the output of NAND gate 178 to the reset input of counter 61.

NAND gate 178 has one input 184 connected from junction 179, and an input 185 connected from a junction 186.

Another junction 190 is provided in reset circuit 75. A resistor 191 is connected between junctions 179 and 190. A resistor 192 is connected between junctions 180 and 190, junction 190 being connected to potential +V.

Gate control circuit 66 includes any two entirely conventional JK flip-flops 187 and 188. For example, flip-flops 187 and 188 may be identical to that shown in FIG. 2 of U.S. Pat. No. 3,541,356 and/or that shown and described in the publication, "Montgomery Phister — Logical Design of Digital Computers," pages 121, 122 and 123 (1963). Junction 186 is connected from the output of NAND gate 177 to the inhibit input 189 of flip-flop 187.

The phrase "drive input" is hereby defined for use herein to include but not be limited to a "clock pulse input" as it is also otherwise known in the prior art. Similarly, the phrase "inhibit input" is hereby defined for use herein as a "reset input" as it is also known in the prior art. As will be apparent from the discussion hereinbefore and hereinafter, the flip-flops 187 and 188 so defined in the paragraph second succeeding this one may be of the type illustrated in FIG. 2 of the said U.S. Pat. No. 3,541,356 and illustrated and described in the said Montgomery Phister publication.

In FIG. 6, gate control circuit 66 has a junction 193 connected to the J inputs of flip-flops 187 and 188. The K inputs to both flip-flops 187 and 188 are grounded at 194 and 195, respectively. A resistor 196 is connected from junction 193 to potential +V.

Flip-flops 187 and 188 have drive inputs 197 and 198 respectively connected from junction 171.

The Q output of flip-flop 187 is connected to a junction 199. The inhibit input of flip-flop 188 at 200 is connected from junction 199.

A NAND gate 201 has an input 202 connected from the $\overline{Q}$ output of flip-flop 188. NAND gate 201 also has an input 203 connected from junction 199.

NAND gate 76 has an input 204. A resistor 205 is connected from potential +V to NAND gate input 204. NAND gate 76 has another input 206 connected from the output of NAND gate 201. The output of NAND gate 76 is then impressed upon one input of gate 59 shown in FIG. 5, NAND gate 76 being shown in the gate control circuit 66 in FIG. 6.

The purpose of gate control circuit 66 is to detect when switch 21 in FIG. 1 is first closed, and to cause the output of gate 59 in FIG. 5 to be a pulse train corresponding to the pulses appearing on an input 108 of gate 59 shown in FIG. 5. When switch 22 in FIG. 1 is closed, gate control circuit 66 places a signal upon an input 109 of gate 59 to suppress the pulse train appearing on input lead 108 thereto.

The foregoing function of gate control circuit 66 is performed as follows. When reset switch 75, shown in FIG. 6, is manually actuated by causing pole 71 to engage contact 74, flip-flop 176 impresses a signal on input 189 of flip-flop 187 such that the Q output of flip-flop 187 is low. The connection of the inhibit input 200 of flip-flop 188 from the Q output of flip-flop 187, when that Q output is low, causes the $\bar{Q}$ output of flip-flop 188 to be high. This disables gate 59 as follows. Since the input 202 of NAND gate 201 is high, and the input 203 thereof is low, the output of NAND gate 201 is high. The output of NAND gate 76 is, therefore, low. When the output of NAND gate 76 in FIG. 6 is low, and this output is applied as an input to gate 59, the said low input prevents pulses applied to gate 59 by one-shot 58 from being counted by counter 61.

When switch 21, shown in FIGS. 1 and 6, is momentarily closed, a pulse is applied to flip-flops 187 and 188 in FIG. 6 by one-shot 65. At this time, flip-flop 188 is still inhibited by the signal applied to the inhibit input 200 thereof. Flip-flop 188, therefore, does not change state. However, the reset signal applied to input 189 of flip-flop 187 is now absent because switch 70 is actuated only momentarily. The pulse output of one-shot 65 then causes flip-flop 187 to change state. The Q output thereof then becomes high. The signals applied to both the inputs 202 and 203 of NAND gate 201 are then both high. The output of NAND gate 201 is low, and the output of NAND gate 76 is high. Again, due to the fact that the output of NAND gate 76 is impressed on gate 59, gate 59 then passes the output of one-shot 58 until the output of NAND gate 201 goes high again, the output of gate 59 being impressed upon counter 61. The output of gate 201 goes high again when switch 22, shown in FIGS. 1 and 6, is closed. This is true because one-shot 65, upon the momentary actuation of switch 22, impresses a pulse on both of the drive inputs of flip-flops 187 and 188. Flip-flop 187 does not then change state because it is already in the 1 state. Flip-flop 188 changes state because the inhibit signal on inhibit output 200 is now high because flip-flop 187 has changed state.

OPERATION

In the operation of the system of the present invention, switch 70 is momentarily actuated to reset, as described previously. Responsive to the successive actuations of switches 21 and 22, shown in FIGS. 1 and 6, NAND gate 76, shown in FIG. 6, produces a positive pulse or gate, the leading and trailing edges of which coincide with the momentary actuation of switches 21 and 22, shown in FIGS. 1 and 6. Between the said leading and trailing edges of the output gate of NAND gate 76, gate 59 passes the output pulses of one-shot 58 to counter 61. These pulses are then counted by counter 61 and indicated in indicator 62.

One feature of the invention resides in the gate control circuit 66 employed to produce the output of NAND gate 76.

An outstanding feature of the invention resides in the use of the trigger circuit 67, shown in FIG. 6. In operation, after reset switch 70 has been manually closed momentarily, capacitor 156 charges to +V through resistor 155. Pulses are generated by momentary contact switches 21 and 22, shown in FIGS. 1 and 6. This is true because capacitor 156 is, by the closure of either one of the switches 21 or 22, discharged through resistor 152.

The resistance of resistor 155 is larger than the resistance of resistor 152. For example, the resistance of resistor 155 may be 5,100 ohms, whereas the resistance of resistor 152 may be 82 ohms. This provides an an outstanding advantage of the invention because, due to the resilience of any springs connected to switches 21 or 22, or due to the resilience of any cantilever springs carrying the spring contacts, or due to the resilience of the contacts themselves because of their bulk and/or compression moduli of elasticity, the contacts of switches 21 and 22 tend to bounce. It is highly critical to the present invention that one-shot 65 produce only one output pulse when ball 33 depresses each of plungers 31 and 32. By employing the higher resistance of resistor 155, the charging rate of capacitor 156 is kept low once capacitor 156 has been discharged by a single closure of one of the switches 21 and 22. By keeping the charging rate of capacitor 156 low, any further discharge caused by contacts bouncing will produce a pulse at junction 147 connected to the inverting input of amplifier 154 which is of an amplitude so low that it will not appear in the output of one-shot 65. That is, any small conventional threshold bias may be set in trigger circuit 67, comparator 63, inverter 64, one-shot 65, or flip-flops 187 and 188 to suppress any small amplitude pulses produced by contact bounce. Such bias already exist and may either partially or completely suppress such small amplitude pulses. Such suppression, at any rate must be of a degree such that flip-flop 187 changes state on the closure of switch 21 and flip-flop 188 does not change state until switch 22 is closed.

The foregoing description of the pulse discrimination function of some of the circuit elements of trigger circuit 67 in FIG. 6 is related to the possibility of contact bounce causing effectively a reclosure of, for example, switch 21 after the switch has already closed once and opened once in succession in that order.

The following is a description of a regenerative amplifier in circuit 67 of FIG. 6 which has a relatively large hysteresis. This regenerative amplifier acts as a pulse discriminator when, for example, switch 21 closes and then subsequently reopens.

Note that if capacitor 156 is fully charged and switch 21 first closes for a very short time and then reopens, the output of amplifier 154 might show a trailing edge of a pulse if the potential of junction 147 rises high enough after the said reopening. This is prevented by the regenerative amplifier icluding amplifier 154 and the positive feedback resistor 161 which is connected from the output to the noninverting input of amplifier 154.

It has been discovered in connection with the present invention tha the said regenerative amplifier has a substantial and ample hysteresis. For example, junction 151 may have a potential which jumps to its highest level when the potential of junction 147 falls below 1.1 volts and which jumps to its lowest level when the potential of junction 147 rises above 2.7 volts. A hysteresis of 1.5 vvolts or 1.6 volts is thus substantial and ample.

The following circuit values are typical, but not critical:

| | |
|---|---|
| Capacitor 93 | 0.0022 Microfarad |
| Capacitor 103 | 0.001 Microfarad |
| Capacitor 156 | 3.3 Microfarad |
| Diode 157 | SD1 |
| Potential V | 5.0 Volts |
| Potentiometer 79 | 5,000 Ohms |
| Potentiometer 137 | 10,000 Ohms |
| Resistor 82 | 1,000 Ohms |
| Resistor 83 | 1,000 Ohms |
| Resistor 78 | 4,500 Ohms |
| Resistor 84 | 4,990 Ohms |
| Resistor 87 | 42,300 Ohms |
| Resistor 88 | 1,000 Ohms |
| Resistor 94 | 4,990 Ohms |
| Resistor 96 | 301,000 Ohms |
| Resistor 97 | 1,500 Ohms |
| Resistor 98 | 1,000 Ohms |
| Resistor 102 | 9,100 Ohms |
| Resistor 104 | 1,100 Ohms |
| Resistor 106 | 1,000 Ohms |
| Resistor 107 | 1,000 Ohms |
| Resistor 116 | 4,990 Ohms |
| Resistor 117 | 4,990 Ohms |
| Resistor 118 | 750,000 Ohms |
| Resistor 119 | 1,000 Ohms |
| Resistor 135 | 215 Ohms |
| Resistor 136 | 1,000 Ohms |
| Resistor 141 | 1,000 Ohms |
| Resistor 152 | 82 Ohms |
| Resistor 153 | 4,660 Ohms |
| Resistor 155 | 5,100 Ohms |
| Resistor 159 | 3,740 Ohms |
| Resistor 160 | 3,740 Ohms |
| Resistor 161 | 10,000 Ohms |
| Resistor 164 | 3,300 Ohms |
| Resistor 165 | 1,000 Ohms |
| Resistor 170 | 2,000 Ohms |
| Resistor 191 | 5,100 Ohms |
| Resistor 192 | 5,100 Ohms |
| Resistor 196 | 1,000 Ohms |
| Resistor 205 | 5,100 Ohms |
| Transistor 127 | 2N4356 |
| Transistor 128 | 2N3566 |
| Transistor 166 | 2N3566 |

As used herein and in the claims, the word "resistor" as employed to describe either resistor 152 or resistor 153 is hereby defined to include either a resistor of a resistance of less than, equal to or greater than 5,000 ohms or simply a conductive lead or other conductor because the resistance of either resistor 152 or resistor 153 may be quite low in some applications.

The word "connected" in any of its grammatical forms is hereby defined for use herein and in the claims to include, but not be limited to, connection by a conductive lead, a resistor or other circuit element, or by a stage or otherwise.

What is claimed is:

1. A gate generator comprising: first and second JK flip-flops each having inhibit, J, K and drive inputs, and Q and $\bar{Q}$ outputs; a D.C. source of potential; a resistor connected from said D.C. source to each J input, both K inputs being connected to ground; a source of pulses, both drive inputs being connected from said pulse source, a NAND gate having first and second inputs and an output, said $\bar{Q}$ output of said first flip-flop being connected to said NAND gate first input, said Q output of said second flip-flop being connected to said NAND gate second input, said second flip-flop Q output being connected to the inhibit input of said first flip-flop; and manually operable means for momentarily changing the potential at said second flip-flop inhibit input to cause said Q output of said second flip-flop to be high.

* * * * *